(12) United States Patent
Tsai

(10) Patent No.: US 10,459,244 B1
(45) Date of Patent: Oct. 29, 2019

(54) ASSEMBLING STRUCTURE FOR EYEGLASSES

(71) Applicant: Min-Ching Tsai, Tainan (TW)

(72) Inventor: Min-Ching Tsai, Tainan (TW)

( * ) Notice: Subject to any disclaimer, the term of this patent is extended or adjusted under 35 U.S.C. 154(b) by 29 days.

(21) Appl. No.: 15/953,596

(22) Filed: Apr. 16, 2018

(51) Int. Cl.
   *G02C 1/08* (2006.01)
   *G02C 1/00* (2006.01)
   *G02C 5/02* (2006.01)
   *G02C 5/12* (2006.01)

(52) U.S. Cl.
   CPC .............. *G02C 1/10* (2013.01); *G02C 1/08* (2013.01); *G02C 5/02* (2013.01); *G02C 5/12* (2013.01)

(58) Field of Classification Search
   CPC . G02C 1/08; G02C 5/008; G02C 5/02; G02C 5/12
   USPC ................................. 351/41, 90–92
   See application file for complete search history.

(56) References Cited

U.S. PATENT DOCUMENTS

| | | | |
|---|---|---|---|
| 5,257,050 A * | 10/1993 | Wiedner ............... | A61F 9/025 351/138 |
| 2017/0219843 A1* | 8/2017 | Albouy ............... | G02C 5/2209 |
| 2018/0292672 A1* | 10/2018 | Patin ............... | G02C 1/08 |
| 2019/0113769 A1* | 4/2019 | Jouard ............... | G02C 11/10 |

FOREIGN PATENT DOCUMENTS

| | | |
|---|---|---|
| TW | M449971 U | 4/2013 |
| TW | M498321 U | 4/2015 |
| TW | M528437 U | 9/2016 |
| TW | M544014 U | 6/2017 |
| TW | M551702 U | 11/2017 |

* cited by examiner

*Primary Examiner* — Darryl J Collins

(74) *Attorney, Agent, or Firm* — Alan D. Kamrath; Karin L. Williams; Mayer & Williams PC

(57) ABSTRACT

A pair of eyeglass includes an eyeglass frame having a central portion with two frame portions respectively and receiving two lenses. The central portion includes a notch between the frame portions. An upper portion of the central portion includes an insertion hole extending in the vertical direction. An opening is defined in an upper end of the insertion hole. A lower portion of the central portion includes an engaging groove extending in the vertical direction and aligned with the insertion hole. At least one fixing hole extends forward from a rear face of the lower portion and intercommunicates with the engaging groove. A coupling block is inserted downwardly into the insertion groove and the engaging groove. At least one fastener extends through the at least one fixing hole from the rear face of the lower portion and engages with at least one fixing hole of the coupling block.

5 Claims, 6 Drawing Sheets

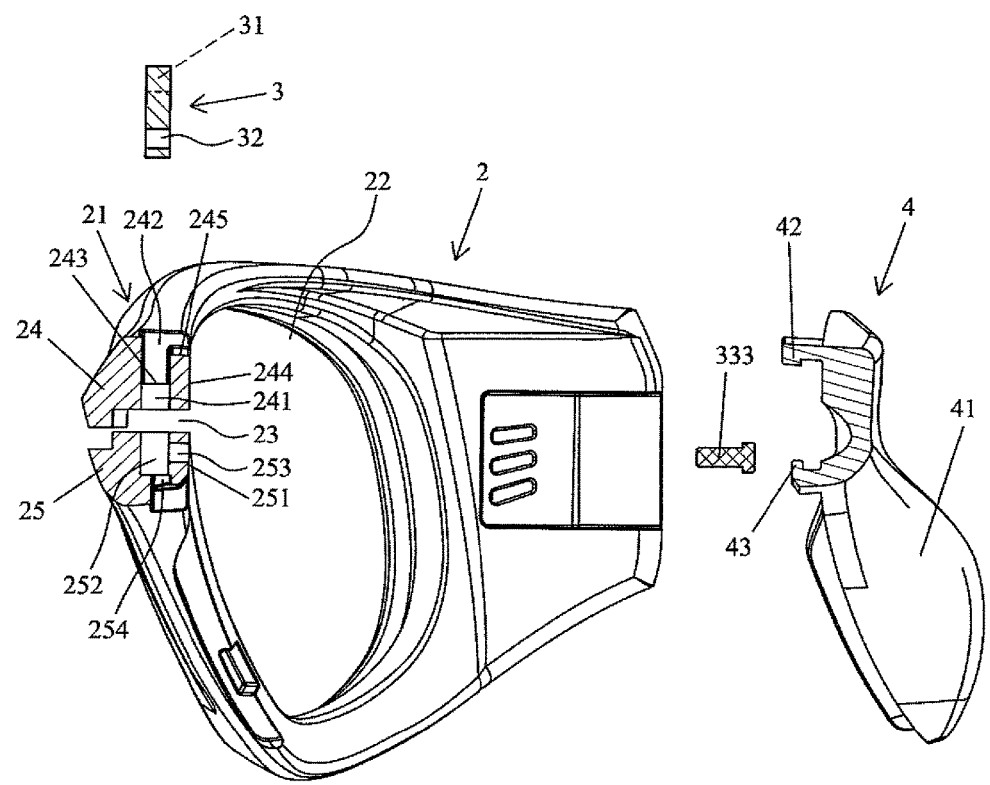
F I G . 2

A - A

B - B

ASSEMBLING STRUCTURE FOR EYEGLASSES

BACKGROUND OF THE INVENTION

The present invention relates to an assembling structure for eyeglasses and, more particularly, to a pair of eyeglasses including replaceable lenses while providing improved stability and improved reliability after assembly.

A pair of eyeglasses generally includes an eyeglass frame, two lenses, and two temples. The eyeglass frame includes a frame portion having two notches respectively at two outer sides thereof. Each notch has a screw hole. The frame portion can be expanded at the notches to permit installation of the lenses in the frame portion. The notches are sealed, and screws extend through the screw holes to assemble the lenses in the eyeglass frame.

However, the screws are disposed at obvious positions at the outer sides of the eyeglass frame, failing to provide a sense of quality of the overall appearance. Furthermore, loosening of any screw could result in falling of the corresponding lens.

Taiwan Utility Model Nos. TWM449971, TWM498321, TWM 544014, TWM550414, and TWM551702 disclose a pair of eyeglasses including an upper frame and a lower frame. The upper and lower frames are coupled together via fasteners to form a receiving frame for receiving two lenses. Since the upper and lower frames are detachable from each other, when the pair of eyeglasses falls inadvertently or under the action of an external force, the upper and lower frames are apt to completely disengage from each other, leading to loss of the lenses.

To solve the drawback of the above mentioned upper and lower frames, an example disclosed in Taiwan Utility Model No. TWM528437 includes an eyeglass frame including a central nose portion having an upper section and a lower section. The upper and lower sections can be expanded and folded. Furthermore, first and second magnetic members are respectively disposed on the upper and lower sections. Thus, lenses can be placed into the eyeglass frame when the upper and lower sections are expanded. The upper and lower sections are closed when the first and second magnetic members attract and come in contact with each other. Thus, the lenses can be securely disposed on the eyeglass frame.

Although the eyeglass frame of the above structure would not separate into two parts and, thus, provides a better assembly integrity. However, the upper and lower sections of the central portion are simply secured by the magnetic members. When the pair of eyeglasses falls or is subject to a larger external force, the upper and lower sections could expand and result in falling off of the lenses.

BRIEF SUMMARY OF THE INVENTION

An objective of the present invention is to provide a pair of eyeglasses including permitting easy installation and easy replacement of lenses while providing improved stability and reliability of assembly.

A pair of eyeglass according to the present invention includes an eyeglass frame including a central portion. The central portion includes two frame portions respectively on two sides thereof. The two lenses are respectively and detachably received in the two frame portions. The central portion includes an intermediate section having a notch between the two frame portions. The central portion includes an upper portion and a lower portion. The upper portion includes an insertion hole extending in the vertical direction. An opening is defined in an upper end of the insertion hole and includes at least one pressing face. The lower portion includes a rear face. The lower portion includes an engaging groove extending in the vertical direction and aligned with the insertion hole. At least one fixing hole extends forward from the rear face of the lower portion and intercommunicates with the engaging groove. A coupling block is inserted downwardly into the insertion groove of the upper portion of the eyeglass frame and the engaging groove of the lower portion. The coupling block includes an upper end having at least one pressing portion pressing against the at least one pressing face. The coupling block further includes a lower end having at least one fixing hole. The notch of the eyeglass frame between the upper portion and the lower portion is narrowed after the two lenses are coupled with the two frame portions of the eyeglass frame. At least one fastener extends through the at least one fixing hole from the rear face of the lower portion and engages with the at least one fixing hole of the coupling block.

In an example, the opening of the upper portion of the eyeglass includes a top end having a width larger than a width of the insertion hole, and the at least one pressing face includes two pressing faces formed at two sides of a bottom end of the opening.

In an example, the at least one fixing hole of the lower portion of the eyeglass frame extends perpendicularly to the engaging groove.

In an example, a nose pad is coupled with the central portion of the eyeglass frame.

In an example, wherein the upper portion includes a rear face, wherein a recessed portion is disposed at a rear side of a top end of the opening. A lower coupling groove extends forward from the rear face of the lower portion. A top face of the coupling block received in the insertion hole is lower than a top end of the insertion hole to form an upper coupling groove. The nose pad is disposed behind the central portion of the eyeglass frame and includes two padding portions at a lower end thereof. The nose pad includes a front side having an upper hook portion and a lower hook portion. The upper hook portion extends through the recessed portion of the upper portion and is coupled with the upper coupling groove. The lower hook portion is coupled with the lower coupling groove of the lower portion.

The coupling block couples with the eyeglass frame in the vertical direction, and the at least one fastener couples with the eyeglass frame and the coupling block in the horizontal direction, providing coupling forces in two directions. Even if the pair of eyeglasses falls in a direction, the coupling force in the other direction can still maintain the coupling effect, significantly increasing the overall assembly stability.

The present invention will become clearer in light of the following detailed description of illustrative embodiments of this invention described in connection with the drawings.

DESCRIPTION OF THE DRAWINGS

FIG. 2 is a partial, exploded, partly cross-sectioned view of the pair of eyeglass of FIG. 1.

DETAILED DESCRIPTION OF THE INVENTION

Figure 1:
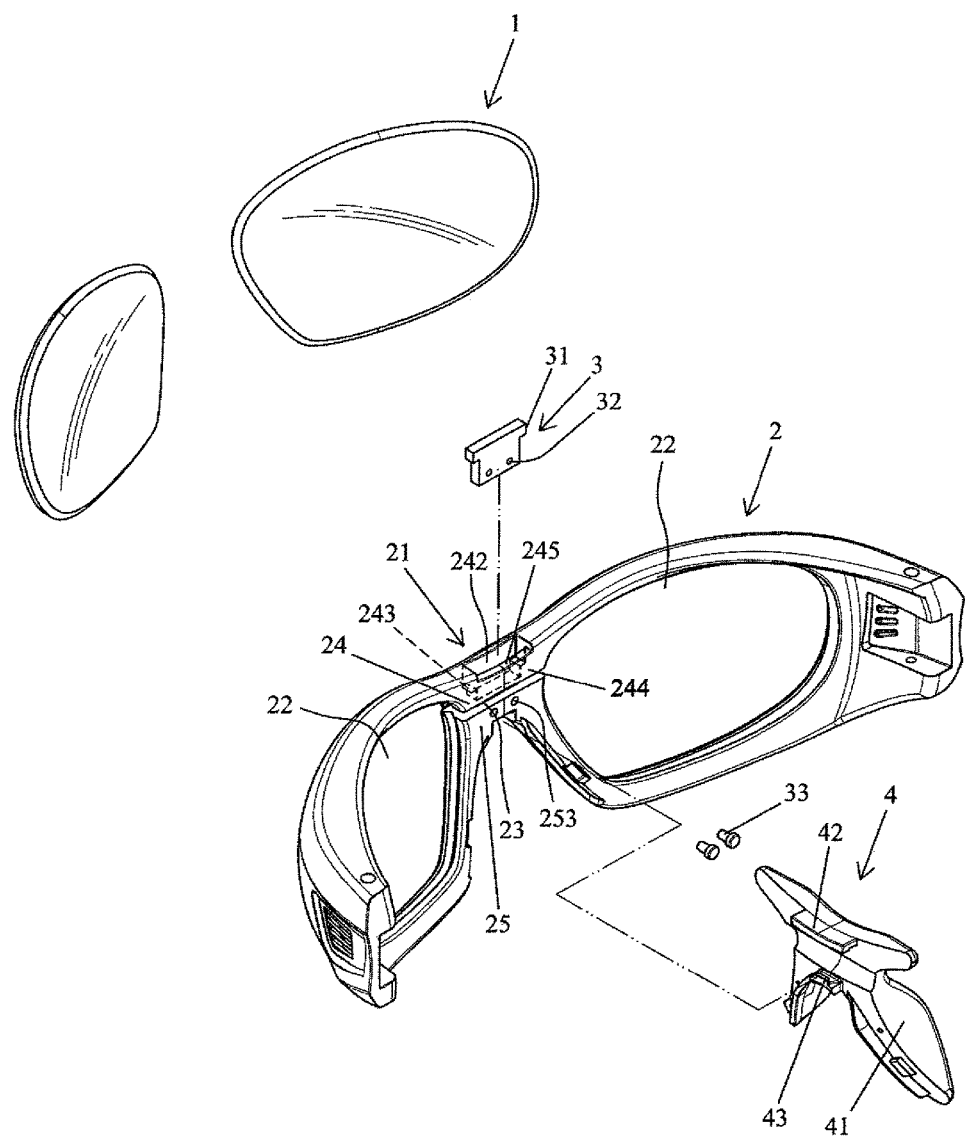
FIG. 1 is an exploded, perspective view of a pair of eyeglasses of an embodiment according to the present invention.
Figure 3:
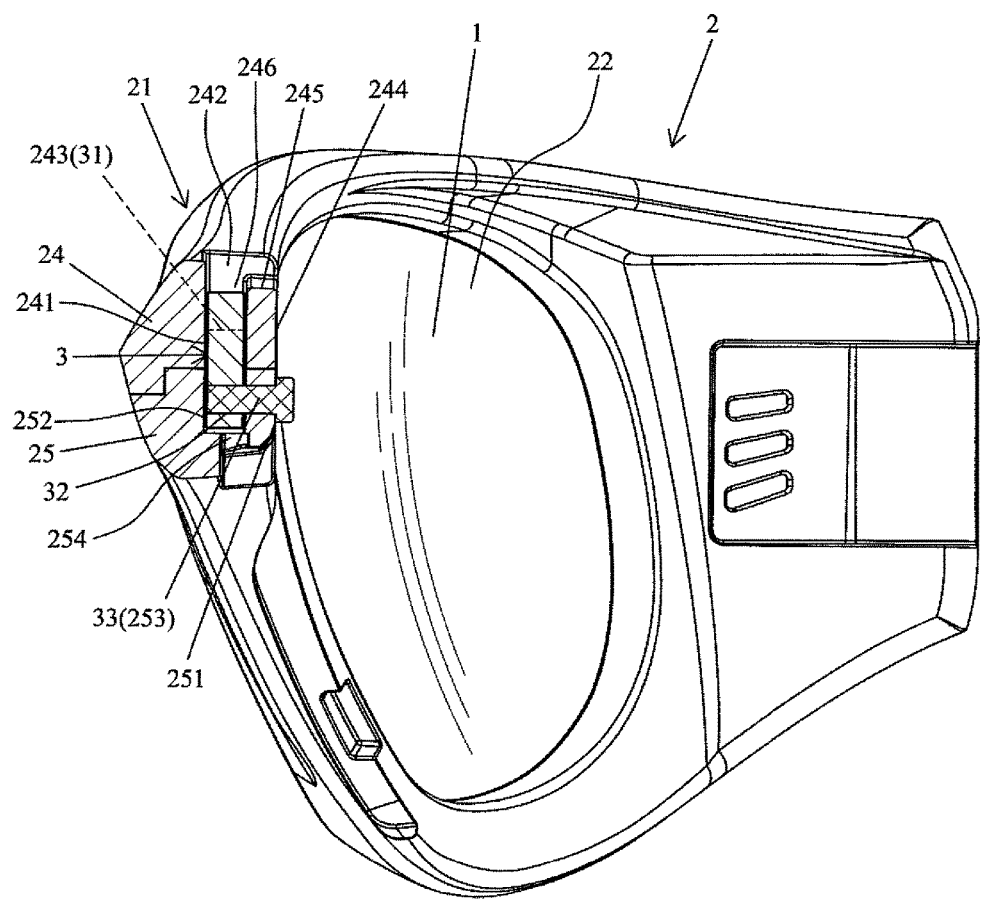
FIG. 3 is a partly cross-sectioned side view of the pair of eyeglass of FIG. 2 after assembly.
Figure 4:
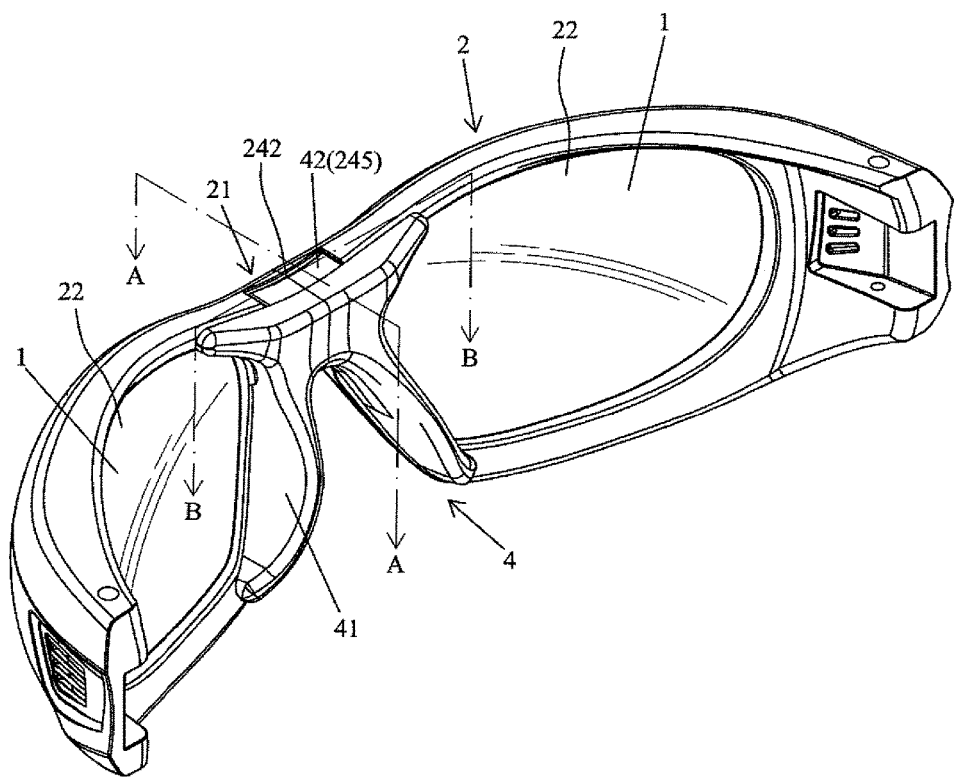
FIG. 4 is a perspective view of the pair of eyeglass of FIG. 1 after assembly.
Figure 5:
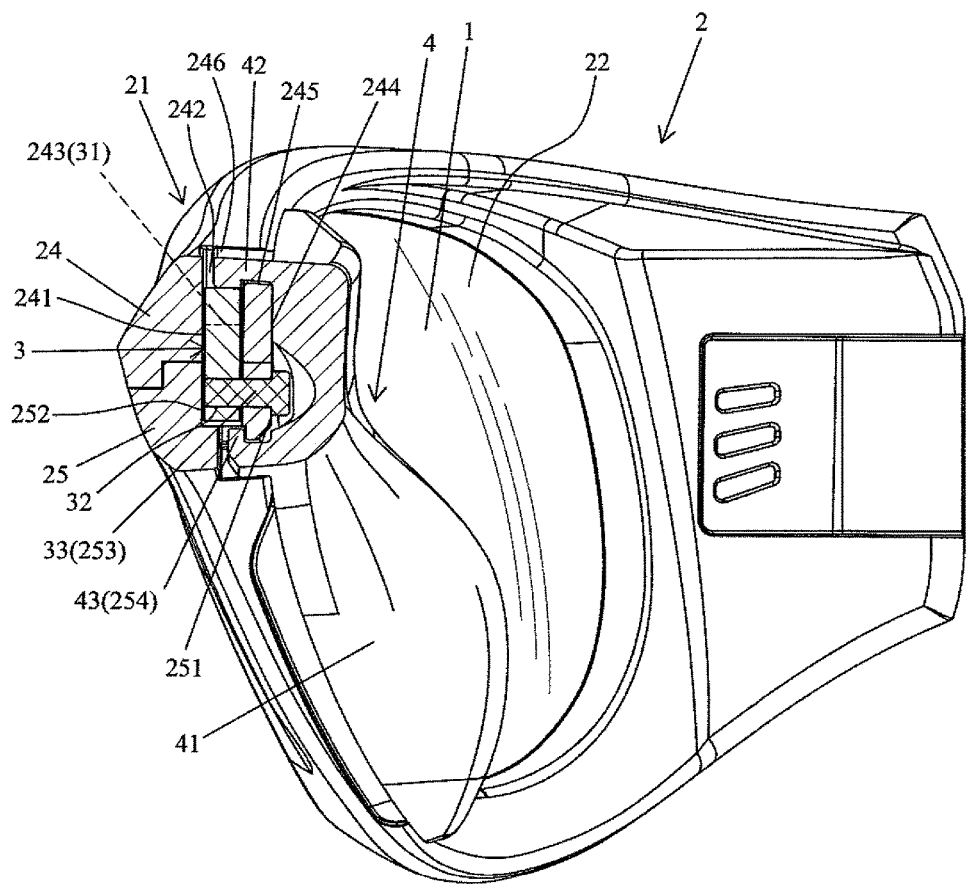
FIG. 5 is a cross sectional view taken along section line A-A of FIG. 4.
Figure 6:
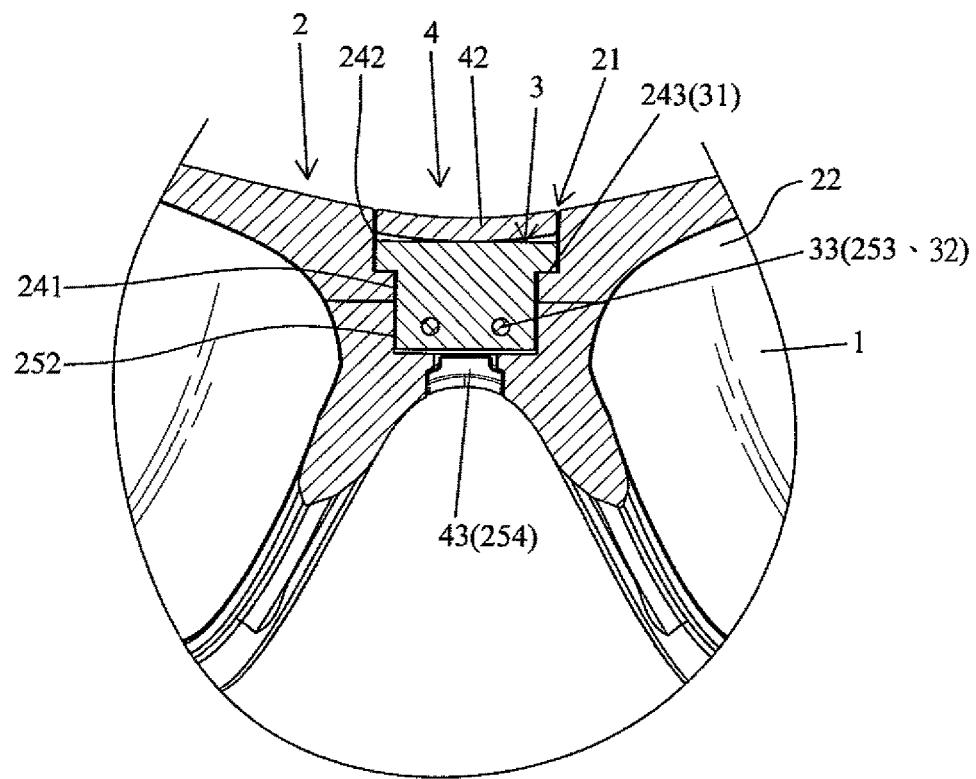
FIG. 6 is a cross sectional view taken along section line B-B of FIG. 4.

With reference to FIGS. 1-3, a pair of eyeglasses according to the present invention includes two lenses 1, an eyeglass frame 2, a coupling block 3 and a nose pad 4. The eyeglass frame 2 includes a central portion 21. The central portion 21 includes two frame portions 22 respectively on two sides thereof. The two lenses 1 are respectively and detachably received in the two frame portions 22. The central portion 21 further includes an intermediate section having a notch 23 between the two frame portions 22. The central portion 21 includes an upper portion 24 and a lower portion 25. The notch 23 between the upper portion 24 and the lower portion 25 can be expanded to permit the two lenses 1 to be inserted into the two frame portions 22. Then, the notch 23 between the upper portion 24 and the lower portion 25 can be narrowed to securely couple the two lenses 1 in the two frame portions 22.

The upper portion 24 includes an insertion hole 241 extending in a vertical direction. An opening 242 is defined in an upper end of the insertion hole 241 and includes at least one pressing face 243. The opening 242 of the upper portion 24 of the eyeglass 2 includes a top end having a width larger than a width of the insertion hole 241. In this embodiment, two pressing faces 243 are formed at two sides of a bottom end of the opening 242. Furthermore, the upper portion 24 includes a rear face 244. A recessed portion 245 is disposed at a rear side of a top end of the opening 242.

The lower portion 25 includes a rear face 251. The lower portion 25 includes an engaging groove 252 extending in the vertical direction and aligned with the insertion hole 241. At least one fixing hole 253 extends forward from the rear face 251 of the lower portion 25 and intercommunicates with the engaging groove 252. In this embodiment, the at least one fixing hole 253 extends perpendicularly to the engaging groove 252. A lower coupling groove 254 extends forward from the rear face 251 of the lower portion 25.

The coupling block 3 can be made of plastic, metal, or other suitable rigid material. The coupling block 3 is inserted downwardly into the insertion hole 241 of the upper portion 24 of the eyeglass frame 2 and the engaging groove 252 of the lower portion 25. A top face of the coupling block 3 received in the insertion hole 241 is lower than a top end of the insertion hole 241 to form an upper coupling groove 246. The coupling block 3 includes an upper end having at least one pressing portion 31 for pressing against the at least one pressing face 243. The coupling block 3 further includes a lower end having at least one fixing hole 32.

With reference to FIG. 3, after the two lenses 1 are coupled with the two frame portions 22 of the eyeglass frame 2, the notch 23 of the eyeglass frame 2 between the upper portion 24 and the lower portion 25 is narrowed, and the at least one fixing hole 32 of the coupling block 3 is aligned with the at least one fixing hole 253 of the lower portion 25. Then, at least one fastener 33 extends through the at least one fixing hole 253 from the rear face 251 of the lower portion 25 and engages with the at least one fixing hole 32 of the coupling block 3. The at least one pressing portion 31 of the coupling block 3 presses against the at least one pressing face 243 of the upper portion 24 to secure the upper portion 24 and the lower portion 25 by the coupling block 3. Since the coupling block 3 extends vertically to couple with the upper portion 24 and the lower portion 25 and since the at least one fastener 33 extends horizontally to engage with the lower portion 25 and the coupling block 3, the central portion 21 of the eyeglass frame 2 has improved assembly stability and improved resistance to impact, preventing the two lenses 1 from falling off when the eyeglass frame 2 falls. The at least one fastener 33 can be detached, and the notch 23 between the upper portion 24 and the lower portion 25 can be expanded to permit replacement of the two lenses 1, which is convenient to the user.

With reference to FIGS. 1-6, the nose pad 4 is coupled to a rear side of the central portion 21 of the eyeglass frame 2. The nose pad 4 is disposed behind the central portion 21 of the eyeglass frame 2 and includes two padding portions 41 at a lower end thereof. The nose pad 4 further includes a front side having an upper hook portion 42 and a lower hook portion 43. The upper hook portion 42 extends through the recessed portion 245 of the upper portion 24 and is coupled with the upper coupling groove 246. The lower hook portion 43 is coupled with the lower coupling groove 254 of the lower portion 25. Thus, the nose pad 4 can be securely mounted to the eyeglass frame 2. Furthermore, the upper hook portion 42 and the lower hook portion 43 are in the form of hooks to hook the upper portion 24 and the lower portion 25 to further improve the assembly stability of the eyeglass frame 2 and the two lenses 1.

In view of the foregoing, the coupling block 3 couples with the eyeglass frame 2 in the vertical direction, and the at least one fastener 33 couples with the eyeglass frame 2 and the coupling block 3 in the horizontal direction, providing coupling forces in two directions. Even if the pair of eyeglasses falls in a direction, the coupling force in the other direction can still maintain the coupling effect, significantly increasing the overall assembly stability. The nose pad 4 can be directly formed on the eyeglass frame 2 or mounted to the eyeglass frame 2 by other provisions.

Although specific embodiments have been illustrated and described, numerous modifications and variations are still possible without departing from the scope of the invention. The scope of the invention is limited by the accompanying claims.

The invention claimed is:

1. A pair of eyeglasses comprising:
   two lenses;
   an eyeglass frame including a central portion, wherein the central portion includes two frame portions respectively on two sides thereof, wherein the two lenses are respectively and detachably received in the two frame portions, wherein the central portion includes an intermediate section having a notch between the two frame portions, wherein the central portion includes an upper portion and a lower portion, wherein the upper portion includes an insertion hole extending in the vertical direction, wherein an opening is defined in an upper end of the insertion hole and includes at least one pressing face, wherein the lower portion includes a rear face, wherein the lower portion includes an engaging groove extending in the vertical direction and aligned with the insertion hole, and wherein at least one fixing hole extends forward from the rear face of the lower portion and intercommunicates with the engaging groove; and
   a coupling block inserted downwardly into the insertion hole of the upper portion of the eyeglass frame and the engaging groove of the lower portion, wherein the coupling block includes an upper end having at least one pressing portion pressing against the at least one pressing face, wherein the coupling block further includes a lower end having at least one fixing hole, wherein the notch of the eyeglass frame between the upper portion and the lower portion is narrowed after the two lenses are coupled with the two frame portions of the eyeglass frame, and wherein at least one fastener extends through the at least one fixing hole from the rear face of the lower portion and engages with the at least one fixing hole of the coupling block.

2. The pair of eyeglasses as claimed in claim 1, wherein the opening of the upper portion of the eyeglass includes a top end having a width larger than a width of the insertion hole, and wherein the at least one pressing face includes two pressing faces formed at two sides of a bottom end of the opening.

3. The pair of eyeglasses as claimed in claim 1, wherein the at least one fixing hole of the lower portion of the eyeglass frame extends perpendicularly to the engaging groove.

4. The pair of eyeglasses as claimed in claim 1, further comprising a nose pad coupled with the central portion of the eyeglass frame.

5. The pair of eyeglasses as claimed in claim 4, wherein the upper portion includes a rear face, wherein a recessed portion is disposed at a rear side of a top end of the opening, wherein a lower coupling groove extends forward from the rear face of the lower portion, wherein a top face of the coupling block received in the insertion hole is lower than a top end of the insertion hole to form an upper coupling groove, wherein the nose pad is disposed behind the central portion of the eyeglass frame and includes two padding portions at a lower end thereof, wherein the nose pad includes a front side having an upper hook portion and a lower hook portion, wherein the upper hook portion extends through the recessed portion of the upper portion and is coupled with the upper coupling groove, and wherein the lower hook portion is coupled with the lower coupling groove of the lower portion.

\* \* \* \* \*